(12) United States Patent
Takashima et al.

(10) Patent No.: US 12,215,405 B2
(45) Date of Patent: *Feb. 4, 2025

(54) HOT-PRESSED MEMBER, COLD-ROLLED STEEL SHEET FOR HOT PRESSING, AND MANUFACTURING METHODS THEREFOR

(71) Applicant: JFE STEEL CORPORATION, Tokyo (JP)

(72) Inventors: Katsutoshi Takashima, Tokyo (JP); Minoru Tanaka, Tokyo (JP); Yoshie Obata, Tokyo (JP); Michitaka Sakurai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 696 days.

This patent is subject to a terminal disclaimer.

(21) Appl. No.: 17/432,218

(22) PCT Filed: Jan. 17, 2020

(86) PCT No.: PCT/JP2020/001584
§ 371 (c)(1),
(2) Date: Aug. 19, 2021

(87) PCT Pub. No.: WO2020/170667
PCT Pub. Date: Aug. 27, 2020

(65) Prior Publication Data
US 2022/0186339 A1 Jun. 16, 2022

(30) Foreign Application Priority Data
Feb. 21, 2019 (JP) .................. 2019-029806

(51) Int. Cl.
C21D 9/48 (2006.01)
B32B 15/01 (2006.01)
C21D 6/00 (2006.01)
C21D 8/04 (2006.01)
C22C 38/00 (2006.01)
C22C 38/02 (2006.01)
C22C 38/04 (2006.01)
C22C 38/06 (2006.01)
C22C 38/42 (2006.01)
C22C 38/44 (2006.01)
C22C 38/46 (2006.01)
C22C 38/48 (2006.01)
C22C 38/50 (2006.01)
C22C 38/54 (2006.01)
C22C 38/58 (2006.01)
(Continued)

(52) U.S. Cl.
CPC .............. *C21D 9/48* (2013.01); *B32B 15/013* (2013.01); *C21D 6/004* (2013.01); *C21D 6/005* (2013.01); *C21D 6/008* (2013.01); *C21D 8/0405* (2013.01); *C21D 8/0426* (2013.01); *C21D 8/0436* (2013.01); *C21D 8/0463* (2013.01); *C22C 38/001* (2013.01); *C22C 38/002* (2013.01); *C22C 38/008* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C21D 2211/001* (2013.01); *C21D 2211/004* (2013.01); *C21D 2211/008* (2013.01); *C23C 2/06* (2013.01); *C23C 2/40* (2013.01)

(58) Field of Classification Search
CPC ................ C21D 1/18; C21D 2211/001; C21D 2211/004; C21D 2211/008; C21D 6/004; C21D 6/005; C21D 6/008; C21D 8/0226; C21D 8/0236; C21D 8/0253; C21D 8/0273; C21D 8/0405; C21D 8/0426; C21D 8/0436; C21D 8/0463; C21D 8/46; C21D 8/48
See application file for complete search history.

(56) References Cited

U.S. PATENT DOCUMENTS 9,845,518 B2 12/2017 Cobo et al.
10,053,752 B2 8/2018 Kuhn et al.
(Continued)

FOREIGN PATENT DOCUMENTS

CN 102625863 A 8/2012
CN 106574348 A 4/2017
(Continued)

OTHER PUBLICATIONS

Oct. 28, 2022, Office Action issued by the China National Intellectual Property Administration in the corresponding Chinese Patent Application No. 202080015482.1 with English language concise statement of relevance.
(Continued)

Primary Examiner — Lois L Zheng
(74) Attorney, Agent, or Firm — KENJA IP LAW PC

(57) ABSTRACT

Provided is a hot-pressed member that combines both high strength of 1850 MPa or more in TS and excellent delayed fracture resistance. A hot-pressed member comprises: a predetermined chemical composition; a microstructure in which a prior austenite average grain size is 8 μm or less, a volume fraction of martensite is 95% or more, and a volume fraction of granular carbide of 0.1 μm or more in grain size is 0.10% to 4.0%; a Ni diffusion region of 2.0 μm or more in a depth direction in a surface layer; and a tensile strength of 1850 MPa or more.

10 Claims, No Drawings

(51) Int. Cl.
  *C22C 38/60* (2006.01)
  *C21D 9/00* (2006.01)
  *C23C 2/06* (2006.01)
  *C23C 2/40* (2006.01)

(56) References Cited

U.S. PATENT DOCUMENTS

| | | | |
|---|---|---|---|
| 10,392,677 | B2 | 8/2019 | Nakagawa et al. |
| 10,870,902 | B2 | 12/2020 | Ono et al. |
| 11,293,074 | B2 * | 4/2022 | Takashima ............ C21D 6/008 |
| 11,850,821 | B2 * | 12/2023 | Takashima ............ C21D 6/008 |
| 2005/0199322 | A1 | 9/2005 | Nakamura et al. |
| 2014/0120366 | A1 | 5/2014 | Sohn |
| 2015/0225821 | A1 | 8/2015 | Hikida et al. |
| 2016/0208355 | A1 | 7/2016 | Nakagaito et al. |
| 2017/0096724 | A1 | 4/2017 | Hikida et al. |
| 2017/0225215 | A1 | 8/2017 | Nakagaito et al. |
| 2020/0131596 | A1 | 4/2020 | Takashima et al. |
| 2020/0172991 | A1 * | 6/2020 | Takashima ............... C23C 2/40 |
| 2020/0353527 | A1 | 11/2020 | Takashima et al. |
| 2020/0354806 | A1 * | 11/2020 | Takashima ............... C21D 1/18 |

FOREIGN PATENT DOCUMENTS

| | | |
|---|---|---|
| CN | 107109553 A | 8/2017 |
| EP | 3088552 A1 | 11/2016 |
| EP | 3647444 A1 | 5/2020 |
| EP | 3647445 A1 | 5/2020 |
| EP | 3647447 A1 | 5/2020 |
| EP | 3647448 A1 | 5/2020 |
| EP | 3647449 A1 | 5/2020 |
| EP | 3647450 A1 | 5/2020 |
| EP | 3680359 A1 | 7/2020 |
| EP | 3712286 A1 | 9/2020 |
| JP | 2002060898 A | 2/2002 |
| JP | 2002322539 A | 11/2002 |
| JP | 2010001566 A | 1/2010 |
| JP | 2014040628 A | 3/2014 |
| JP | 2014118613 A | 6/2014 |
| JP | 2014122398 A | 7/2014 |
| JP | 2015113500 A | 6/2015 |
| WO | 2009145563 A2 | 12/2009 |
| WO | 2016152163 A1 | 9/2016 |
| WO | 2019003538 A1 | 1/2019 |
| WO | 2019003539 A1 | 1/2019 |
| WO | 2019003540 A1 | 1/2019 |
| WO | 2019003541 A1 | 1/2019 |
| WO | 2019003542 A1 | 1/2019 |
| WO | 2019003543 A1 | 1/2019 |
| WO | 2019093376 A1 | 5/2019 |
| WO | 2019093384 A1 | 5/2019 |

OTHER PUBLICATIONS

Mar. 31, 2020, International Search Report issued in the International Patent Application No. PCT/JP2020/001584.

Oct. 25, 2021, the Extended European Search Report issued by the European Patent Office in the corresponding European Patent Application No. 20758909.4.

May 10, 2022, Office Action issued by the China National Intellectual Property Administration in the corresponding Chinese Patent Application No. 202080015482.1 with English language search report.

Dong Wei Fan et al., State-of-the-Knowledge on Coating Systems for Hot Stamped Parts, steel research international, 2012, pp. 412-433, vol. 83, No. 5.

Japanese Standards Association, JIS Z 2201 : 1998, Test pieces for tensile test for metallic materials, Japanese Industrial Standard, 1998.

Jun. 28, 2024, Communication of a notice of opposition issued by the European Patent Office in the corresponding European Patent No. 3929321.

Prior art search strategy for identifying documents describing the parameter "volume fraction of granular carbide of 0.1 μm or more in grain size", Jun. 5, 2024, lavoix.

Search results of Prior art search strategy for identifying documents describing the parameter "volume fraction of granular carbide of 0.1 μm or more in grain size", Jun. 5, 2024, Questel—FAMPAT.

Toshimi Tarui et al., Approaches for Fundamental Principles 1: Evaluation Method of Hydrogen Embrittlement and Improvement Techniques of Delayed Fracture, Nippon Steel Technical Report, Nov. 2012, No. 101.

* cited by examiner

HOT-PRESSED MEMBER, COLD-ROLLED STEEL SHEET FOR HOT PRESSING, AND MANUFACTURING METHODS THEREFOR

TECHNICAL FIELD

The present disclosure relates to a hot-pressed member, a cold-rolled steel sheet for hot pressing, and production methods therefor.

BACKGROUND

In recent years, $CO_2$ emission control has been tightened due to growing concern about environmental problems. In the automobile industry, it has been important to make automotive bodies more lightweight to improve fuel efficiency. In view of this, the use of high strength steel sheets in automotive parts has been promoted for thickness reduction, and the use of steel sheets with a tensile strength (TS) of 1850 MPa or more has been studied. High strength steel sheets used for structural members or reinforcing members of automobiles are required to have excellent formability. A steel sheet of 1850 MPa or more typically has low ductility, and therefore tends to be cracked in cold press forming. Moreover, since the steel sheet has high yield stress, large spring back occurs, which makes it difficult to achieve high dimensional accuracy after cold press forming. Furthermore, residual stress remains in the steel sheet after cold press forming, and thus there is a possibility of delayed fracture (hydrogen embrittlement) caused by hydrogen that enters from the use environment.

Under such circumstances, press forming by hot pressing (also called hot stamping, die quenching, press quenching, etc.) has been receiving attention as a strengthening technique. Hot pressing is a forming method that involves heating a steel sheet to a temperature range of austenite single phase and then forming (working) the steel sheet maintained at high temperature to achieve forming with high dimensional accuracy, and cooling the steel sheet to quench it after the forming to achieve strengthening. With hot pressing, the residual stress after press forming is lower than that in the case where cold pressing is performed, so that the delayed fracture resistance is improved.

However, in resistance spot welding which is often used in automobile assembly processes, stress is also applied to hot-pressed members in order to maintain the rigidity of the whole automotive body, and accordingly concern about delayed fractures after press forming remains. There is also concern about delayed fractures in resistance spot weld portions. Improvement in the delayed fracture resistance of hot-pressed members is thus needed.

Some means of improving the delayed fracture resistance of hot-pressed members have been reported so far.

JP 2015-113500 A (PTL 1) discloses a technique of improving delayed fracture resistance by controlling the precipitation amounts of alloy carbonitride and cementite.

JP 2014-122398 A (PTL 2) discloses a technique of improving delayed fracture resistance by forming retained austenite after hot pressing.

CITATION LIST

Patent Literatures

PTL 1: JP 2015-113500 A
PTL 2: JP 2014-122398 A

SUMMARY

Technical Problem

With the method in PTL 1, improvement in a high strength region of 1850 MPa or more in TS is difficult. With the method in PTL 2, the delayed fracture property of base metal is improved. However, due to concentration distribution of retained austenite, segregation occurs after resistance spot welding, which leads to cracking.

Thus, it has been difficult to improve the delayed fracture resistance of a hot-pressed member of 1850 MPa or more in TS regardless of the welding conditions, and no steel sheet has been developed that combines both of these properties.

It could therefore be helpful to provide a hot-pressed member that combines both high strength of 1850 MPa or more in TS and excellent delayed fracture resistance, together with a production method therefor.

It could also be helpful to provide a cold-rolled steel sheet for hot pressing from which the hot-pressed member can be yielded, together with a production method therefor.

Herein, "excellent delayed fracture resistance" denotes excellent delayed fracture resistance not only in the base metal but also in the resistance spot weld portion. Specifically, "excellent delayed fracture resistance" denotes the following: In the evaluation of the base metal in the below-described examples, no fracture occurred even when the base metal was immersed in a test fluid for 100 hr under a load of 1000 MPa, and in the evaluation of the weld in the below-described examples, no peeling was found even when the weld was immersed in a test fluid after a load was applied.

Solution to Problem

As a result of intensive studies, we discovered the following:

When an automobile produced by forming an automotive body using a hot-pressed member is actually run repeatedly, hydrogen is electrochemically generated on the member because of rain and the like, and part of it enters the member. If the member is not stressed, such hydrogen does not cause a delayed fracture. However, given that the member may be stressed due to resistance spot welding, concern about a delayed fracture cannot be eliminated.

While a cathode reaction of a corrosion reaction due to rain and the like is mainly oxygen reduction, part of the reaction is hydrogen reduction. The electrochemical hydrogen generation is due to this reduction.

Regarding these problems:

(1) an effective way of suppressing the influence of hydrogen that has entered the member is to disperse granular carbide in the member to form a hydrogen trapping site, and (2) an effective way of suppressing the electrochemical hydrogen generation is to both provide a Ni diffusion region in the surface layer of the member to shift the potential to high and contain Cu in the member to increase hydrogen overvoltage.

The present disclosure is based on these discoveries. We thus provide the following.

[1] A hot-pressed member, comprising: a chemical composition containing (consisting of), in mass %, C: 0.31% or more and less than 0.55%, Si: 0.01% or more and 1.0% or less, Mn: 1.0% or more and 2.5% or less, P: 0.05% or less, S: 0.005% or less, Al: 0.01% or more and 0.50% or less, N: 0.01% or less, and Cu: 0.002% or more and 0.25% or less, with a balance consisting of Fe and inevitable impurities; a microstructure in which a prior austenite average grain size is 8 μm or less, a volume fraction of martensite is 95% or more, and a volume fraction of granular carbide of 0.1 μm or more in grain size is 0.10% or more and 4.0% or less; a Ni diffusion region of 2.0 μm or more in a depth direction in a surface layer; and a tensile strength of 1850 MPa or more.

[2] The hot-pressed member according to [1], wherein the chemical composition further contains, in mass %, one or more selected from the group consisting of Mo: 0.005% or more and 0.35% or less, Cr: 0.005% or more and 0.35% or less, Nb: 0.001% or more and 0.05% or less, Ti: 0.001% or more and 0.050% or less, B: 0.0002% or more and 0.0050% or less, Ca: 0.005% or less, V: 0.05% or less, Sb: 0.001% or more and 0.020% or less, Ni: 0.50% or less, and Sn: 0.50% or less.

[3] The hot-pressed member according to [1] or [2], further comprising a Ni-containing Zn or Zn alloy coating or plating layer at a surface thereof.

[4] A cold-rolled steel sheet for hot pressing, comprising: a chemical composition containing, in mass %, C: 0.31% or more and less than 0.55%, Si: 0.01% or more and 1.0% or less, Mn: 1.0% or more and 2.5% or less, P: 0.05% or less, S: 0.005% or less, Al: 0.01% or more and 0.50% or less, N: 0.01% or less, and Cu: 0.002% or more and 0.25% or less, with a balance consisting of Fe and inevitable impurities; and a microstructure in which a volume fraction of granular carbide of 0.1 μm or more in grain size is 1.0% or more and 25% or less.

[5] The cold-rolled steel sheet for hot pressing according to [4], wherein the chemical composition further contains, in mass %, one or more selected from the group consisting of Mo: 0.005% or more and 0.35% or less, Cr: 0.005% or more and 0.35% or less, Nb: 0.001% or more and 0.05% or less, Ti: 0.001% or more and 0.050% or less, B: 0.0002% or more and 0.0050% or less, Ca: 0.005% or less, V: 0.05% or less, Sb: 0.001% or more and 0.020% or less, Ni: 0.50% or less, and Sn: 0.50% or less.

[6] The cold-rolled steel sheet for hot pressing according to [4] or [5], further comprising a Ni-containing coating or plating layer of 0.5 μm or more in thickness, at a surface thereof.

[7] The cold-rolled steel sheet for hot pressing according to [6], wherein the Ni-containing coating or plating layer is a Ni-containing Zn or Zn alloy coating or plating layer.

[8] A manufacturing method for a cold-rolled steel sheet for hot pressing, comprising: hot rolling a steel slab having the chemical composition according to [4] or [5] at a finisher delivery temperature of 840° C. or more and 950° C. or less, to obtain a hot-rolled steel sheet; cooling the hot-rolled steel sheet to a cooling stop temperature of 700° C. or less at a primary average cooling rate of 55° C./s or more as primary cooling, thereafter cooling the hot-rolled steel sheet to a coiling start temperature of 650° C. or less at a secondary average cooling rate of 5° C./s or more and 60° C./s or less as secondary cooling, and thereafter subjecting the hot-rolled steel sheet to coiling and pickling; cold rolling the hot-rolled steel sheet to obtain a cold-rolled steel sheet; and heating the cold-rolled steel sheet to a soaking temperature of 550° C. or more and 680° C. or less at an average heating rate of 1° C./s or less, holding the cold-rolled steel sheet at the temperature for 60 min or more and 3000 min or less, and thereafter cooling the cold-rolled steel sheet to room temperature.

[9] The manufacturing method for a cold-rolled steel sheet for hot pressing according to [8], comprising performing a coating or plating treatment on a surface of the cold-rolled steel sheet with a Ni-containing coating or plating.

[10] A manufacturing method for a hot-pressed member, comprising heating the cold-rolled steel sheet for hot pressing according to any one of [4] to [7] to a temperature range of 850° C. or more and 1000° C. or less, and thereafter hot pressing the cold-rolled steel sheet.

Advantageous Effect

It is thus possible to provide a hot-pressed member that combines both high strength of 1850 MPa or more in TS and excellent delayed fracture resistance, together with a production method therefor.

It is also possible to provide a cold-rolled steel sheet for hot pressing from which the hot-pressed member can be yielded, together with a production method therefor.

By using a hot-pressed member according to the present disclosure as a member for an automobile, the automotive body can be reduced in weight and thus the fuel efficiency can be improved. The presently disclosed technique therefore has high industrial use value.

DETAILED DESCRIPTION

The presently disclosed technique will be described in detail below.

[Chemical Composition of Hot-Pressed Member and Cold-Rolled Steel Sheet for Hot Pressing]

The chemical composition of a hot-pressed member and a cold-rolled steel sheet for hot pressing according to one of the disclosed embodiments will be described below. The unit of the content of each element in the chemical composition is "mass %", but is simply expressed as "%" unless otherwise noted.

C: 0.31% or more and less than 0.55%

C is an element effective in strengthening, and is important in order to ensure the desired volume fraction of martensite after hot pressing and enhance the strength of the member. Moreover, in the present disclosure, C is important in order to cause granular carbide serving as a hydrogen trapping site to be present in the member and improve the delayed fracture resistance.

If the C content is less than 0.31%, it is difficult to ensure the desired volume fraction of martensite, and the desired strength cannot be achieved. In addition, the desired volume fraction of granular carbide cannot be obtained after annealing and hot pressing, and the delayed fracture resistance of the base metal and the weld portion decreases. The C content is therefore 0.31% or more. The C content is preferably 0.32% or more.

If the C content is 0.55% or more, the delayed fracture resistance of the base metal decreases. Moreover, the volume fraction of granular carbide after annealing and hot pressing is excessive, and the delayed fracture resistance of the weld portion decreases. The C content is therefore less than 0.55%. The C content is preferably less than 0.45%, and further preferably less than 0.42%.

Si: 0.01% or more and 1.0% or less

Si is an element that contributes to higher strength by solid solution strengthening ferrite. If the Si content is excessive, the chemical convertibility degrades. The Si content is therefore 1.0% or less. The Si content is preferably 0.8% or less. Although no lower limit is placed on the Si content, extremely low Si content causes an increase in costs, and accordingly the Si content is 0.01% or more.

Mn: 1.0% or more and 2.5% or less

Mn is an element that enhances the hardenability in hot pressing and thus contributes to the formation of martensite after the hot pressing, i.e. contributes to higher strength. To achieve this effect, the Mn content is 1.0% or more. The Mn content is preferably 1.2% or more. If the Mn content is excessive, Mn band forms excessively, and the potential of the weld portion inclines to low in some parts, which can adversely affect the delayed fracture resistance. The Mn content is therefore 2.5% or less. The Mn content is preferably 2.2% or less, and further preferably 2.0% or less.

P: 0.05% or less

P is an element that contributes to higher strength by solid solution strengthening. If the P content is excessive, considerable segregation to grain boundaries occurs and embrittles the grain boundaries, which can adversely affect the delayed fracture resistance. The P content is therefore 0.05% or less. The P content is preferably 0.04% or less. Although no lower limit is placed on the P content, extremely low P content causes an increase in steelmaking costs, and accordingly the P content is preferably 0.0005% or more.

S: 0.005% or less

If the S content is high, sulfide such as MnS forms in a large amount, and cracking occurs from inclusions of such sulfide, which can adversely affect the delayed fracture resistance. The S content is therefore 0.005% or less. The S content is preferably 0.004% or less. Although no lower limit is placed on the S content, extremely low S content causes an increase in steelmaking costs as with P, and accordingly the S content is preferably 0.0002% or more.

Al: 0.01% or more and 0.50% or less

Al is an element necessary for deoxidation. To achieve this effect, the Al content is 0.01% or more. If the Al content is more than 0.50%, the effect is saturated. The Al content is therefore 0.50% or less. The Al content is preferably 0.40% or less.

N: 0.01% or less

N forms coarse nitride and degrades the bending collapse resistance. If the N content is more than 0.01%, this tendency becomes noticeable. The N content is therefore 0.01% or less. The N content is preferably 0.008% or less. Although no lower limit is placed on the N content, extremely low N content causes an increase in costs, and accordingly the N content is preferably 0.0005% or more.

Cu: 0.002% or more and 0.25% or less

Cu is an element that contributes to higher strength by solid solution strengthening. Moreover, in the present disclosure, Cu is an important element because it increases hydrogen overvoltage and suppresses electrochemical hydrogen generation to thus improve the delayed fracture resistance of the base metal and the weld portion. To achieve these effects, the Cu content is 0.002% or more. The Cu content is preferably 0.005% or more. If the Cu content is more than 0.25%, the effects are saturated. Besides, surface defects caused by Cu tend to occur, which can adversely affect the delayed fracture resistance. The Cu content is therefore 0.25% or less. The Cu content is preferably 0.23% or less.

The hot-pressed member and the cold-rolled steel sheet for hot pressing according to one of the disclosed embodiments may further contain one or more of the following components.

Mo: 0.005% or more and 0.35% or less

Mo is an element that enhances the hardenability in hot pressing and thus contributes to the formation of martensite after the hot pressing, i.e. contributes to higher strength. In the case of containing Mo, to achieve this effect, the Mo content is 0.005% or more. The Mo content is preferably 0.01% or more. If Mo is contained in a large amount, the effect is saturated. Moreover, the costs increase, and the chemical convertibility may degrade. The Mo content is therefore 0.35% or less. The Mo content is preferably 0.30% or less.

Cr: 0.005% or more and 0.35% or less

Cr is an element that enhances the hardenability in hot pressing and thus contributes to the formation of martensite after the hot pressing, i.e. contributes to higher strength, as with Mo. In the case of containing Cr, to achieve this effect, the Cr content is 0.005% or more. The Cr content is preferably 0.01% or more. If Cr is contained in a large amount, the effect is saturated. Moreover, surface oxide forms, as a result of which the coatability may degrade. The Cr content is therefore 0.35% or less. The Cr content is preferably 0.30% or less.

Nb: 0.001% or more and 0.05% or less

Nb is an element that forms fine carbonitride and thus contributes to higher strength, and also refines the austenite grain size in hot pressing and thus contributes to improved delayed fracture resistance. In the case of containing Nb, to achieve these effects, the Nb content is 0.001% or more. The Nb content is preferably 0.005% or more. If Nb is contained in a large amount, the effects are saturated, and the costs increase. The Nb content is therefore 0.05% or less. The Nb content is preferably 0.03% or less.

Ti: 0.001% or more and 0.050% or less

Ti is an element that forms fine carbonitride and thus contributes to higher strength, and also refines the austenite grain size in hot pressing and thus contributes to improved delayed fracture resistance. In the case of containing Ti, to achieve these effects, the Ti content is 0.001% or more. The Ti content is preferably 0.005% or more. If Ti is contained in a large amount, the elongation after the hot pressing decreases considerably. The Ti content is therefore 0.050% or less. The Ti content is preferably 0.040% or less.

B: 0.0002% or more and 0.0050% or less

B is an element that enhances the hardenability in hot pressing and thus contributes to the formation of martensite after the hot pressing, i.e. contributes to higher strength. B is also effective for the delayed fracture resistance as it contributes to improved grain boundary strength by segregation to grain boundaries. In the case of containing B, to achieve these effects, the B content is 0.0002% or more. The B content is preferably 0.0005% or more. If B is contained in a large amount, it forms coarse precipitates together with N, which can adversely affect the delayed fracture resistance. The B content is therefore 0.0050% or less. The B content is preferably 0.0035% or less.

Ca: 0.005% or less

Ca is an element effective for the delayed fracture resistance as it controls the shapes of sulfide and oxide and suppresses the formation of coarse MnS. In the case of containing Ca, to achieve this effect, the Ca content is preferably 0.0005% or more. The Ca content is more preferably 0.0008% or more. If Ca is contained in a large amount, the workability degrades. The Ca content is therefore 0.005% or less. The Ca content is preferably 0.0035% or less.

V: 0.05% or less

V is an element that forms fine carbonitride and thus contributes to higher strength. In the case of containing V, to achieve this effect, the V content is preferably 0.01% or more. The V content is more preferably 0.015% or more. If V is contained in a large amount, the delayed fracture resistance can be adversely affected. The V content is therefore 0.05% or less. The V content is preferably 0.035% or less.

Sb: 0.001% or more and 0.020% or less

Sb is an element that is effective in suppressing the decarburized layer in the surface layer during heating or cooling of the steel sheet, and makes the potential distribution of the surface uniform and thus contributes to improved delayed fracture resistance. In the case of containing Sb, to achieve these effects, the Sb content is 0.001% or more. The Sb content is preferably 0.002% or more. If Sb is contained in a large amount, the rolling load increases and the productivity decreases. The Sb content is therefore 0.020% or less. The Sb content is preferably 0.018% or less.

Ni: 0.50% or less

Ni is an element effective for the delayed fracture resistance as it improves the corrosion resistance and reduces the potential difference between the weld portion and a nut or a bolt. In the case where Ni is contained together with Cu, Ni has an effect of suppressing surface defects caused by Cu, and accordingly is an effective element in the present disclosure in which Cu is an essential component. In the case of containing Ni, to achieve these effects, the Ni content is preferably 0.005% or more. The Ni content is more preferably 0.05% or more. If Ni is contained in a large amount, the bending collapse resistance decreases and the tensile shear stress decreases. The Ni content is therefore 0.50% or less. The Ni content is preferably 0.35% or less.

Sn: 0.50% or less

Sn is an element effective in improving the delayed fracture resistance as it improves the corrosion resistance. In the case of containing Sn, to achieve this effect, the Sn content is preferably 0.01% or more. The Sn content is more preferably 0.05% or more. If Sn is contained in a large amount, the delayed fracture resistance can be adversely affected. The Sn content is therefore 0.50% or less. The Sn content is preferably 0.35% or less.

In the hot-pressed member and the cold-rolled steel sheet for hot pressing according to one of the disclosed embodiments, the balance other than the above consists of Fe and inevitable impurities. Examples of the inevitable impurities include Zn, Co, Zr, Ta, and W. The allowable ranges of the contents of these elements are Zn: 0.01% or less, Co: 0.10% or less, Zr: 0.10% or less, Ta: 0.10% or less, and W: 0.10% or less.

[Microstructure of Hot-Pressed Member]

The microstructure and the like of the hot-pressed member according to one of the disclosed embodiments will be described in detail below. The hot-pressed member according to one of the disclosed embodiments has steel microstructure in which the prior austenite average grain size is 8 μm or less, the volume fraction of martensite is 95% or more, and the volume fraction of granular carbide of 0.1 μm or more in grain size is 0.10% or more and 4.0% or less.

The volume fraction in the microstructure of the hot-pressed member can be measured as follows:

From a hat top portion or a portion similar to the hat top portion in the hot-pressed member, a test piece for microstructure observation is collected so that a plane parallel to the rolling direction and perpendicular to the hat top surface will be an observation plane. The observation plane is polished, and etched using a 3 vol % nital solution to reveal the microstructure. The microstructure at a position of ¼ of the thickness is observed for ten observation fields (one observation field: 30 μm×25 μm) using a scanning electron microscope (SEM, 5000 magnification). The area ratio of each of martensite and granular carbide of 0.1 μm or more in grain size is measured by a point counting method (in accordance with ASTM E562-83 (1988)), and the arithmetic mean area ratio is calculated for each of martensite and granular carbide of 0.1 μm or more in grain size and taken to be the volume fraction.

Herein, the grain size of granular carbide is the equivalent circular diameter of carbide observed as a granular material in the SEM observation.

The volume fraction calculated in this way is the volume fraction with respect to the whole hot-pressed member.

The prior austenite average grain size in the microstructure of the hot-pressed member can be measured as follows:

From the hat top portion or the portion similar to the hat top portion in the hot-pressed member, a test piece for microstructure observation is collected so that a plane parallel to the rolling direction and perpendicular to the hat top surface will be an observation plane. The observation plane is polished, and etched using a 3 vol % nital solution to reveal the microstructure. The microstructure at a position of ¼ in the thickness direction from the surface is observed for ten observation fields (one observation field: 50 μm×40 μm) using a scanning electron microscope (SEM, 3000 magnification). The equivalent circular diameters of prior austenite grains are measured using Image-Pro by Media Cybernetics, Inc., and the arithmetic mean is calculated and taken to be the prior austenite average grain size.

If the volume fraction of martensite is less than 95%, the desired tensile strength cannot be achieved. Accordingly, the volume fraction of martensite is 95% or more. The volume fraction of martensite is preferably 98% or more.

If the volume fraction of granular carbide of 0.1 μm or more in grain size is less than 0.10%, it does not function as a hydrogen trapping site, so that the delayed fracture resistance decreases. Accordingly, the volume fraction is 0.10% or more. The volume fraction is preferably 0.30% or more. If the volume fraction is more than 4.0%, the granular carbide excessively segregates to a heat-affected zone (HAZ) after resistance spot welding, so that the delayed fracture resistance decreases. Accordingly, the volume fraction is 4.0% or less. The volume fraction is preferably 3.2% or less.

The steel microstructure is basically composed of martensite and granular carbide. As residual microstructures other than these, bainite, ferrite, cementite, pearlite, and the like may be contained only in trace amounts. The total volume fraction of such residual microstructures can be calculated by subtracting the volume fraction of martensite and the volume fraction of granular carbide of 0.1 μm or more in grain size from 100%. The allowable amount of the residual microstructures is less than 4.90% (including 0%), and is preferably 4% or less (including 0%).

If the prior austenite average grain size is more than 8 μm, the delayed fracture resistance of the base metal and the weld portion degrades. The prior austenite average grain size is therefore 8 μm or less. The prior austenite average grain size is preferably 7 μm or less. Although no lower limit is placed on the prior austenite average grain size, for example the prior austenite average grain size may be 3 μm or more, and is more preferably 4 μm or more.

[Ni Diffusion Region in Surface Layer of Hot-Pressed Member]

A Ni diffusion region in the surface layer of the hot-pressed member according to one of the disclosed embodiments will be described in detail below. The hot-pressed member according to one of the disclosed embodiments has a Ni diffusion region of 2.0 μm or more in the depth direction, in its surface layer. This can shift the potential to high, suppress electrochemical hydrogen generation, and consequently improve the delayed fracture resistance. The thickness of the Ni diffusion region is preferably 2.5 μm or more. From the viewpoint of weldability, the thickness may be 200 μm or less, and is preferably 150 μm or less. As long as the thickness is 2.0 μm or more, the thickness may be 50 μm or less.

The Ni diffusion region in the surface layer of the hot-pressed member can be measured as follows:

From the hat top portion or the portion similar to the hat top portion in the hot-pressed member, a test piece for microstructure observation is collected so that a thickness section parallel to the rolling direction will be an observation plane. After polishing the observation plane, the element distributions of Fe and Ni are mapped in the surface layer for ten observation fields (one observation field: 200 μm×200 μm) using an electron probe microanalyzer (EPMA). In the mapping, a region in which Fe is detected as a matrix and the concentration of Ni is higher than in the surroundings is taken to be a Ni diffusion region, and its average length in the depth direction is calculated and taken to be the thickness of the Ni diffusion region. Herein, the surface layer in the hot-pressed member denotes the surface layer of the steel sheet that forms the hot-pressed member. While the hot-pressed member may have a coating or plating layer at its surface, such a coating or plating layer is not included in the surface layer of the steel sheet.

The hot-pressed member may have a coating or plating layer (for example, a Zn coating or plating layer) at its surface. Such a hot-pressed member can be obtained by hot pressing a cold-rolled steel sheet having a coating or plating layer at its surface. The Ni diffusion region may be formed as follows: As a result of hot pressing a cold-rolled steel sheet having a Ni-containing coating or plating layer (for example, a Ni-containing Zn or Zn alloy coating or plating layer), Ni in the coating or plating layer diffuses into the surface layer.

[Microstructure of Cold-Rolled Steel Sheet for Hot Pressing]

The microstructure and the like of the cold-rolled steel sheet for hot pressing according to one of the disclosed embodiments will be described in detail below.

It is important to control the microstructure of the cold-rolled steel sheet for hot pressing, in order to achieve the desired properties of the hot-pressed member. In the cold-rolled steel sheet for hot pressing according to one of the disclosed embodiments, the volume fraction of granular carbide of 0.1 μm or more in grain size is 1.0% or more and 25% or less. As long as the volume fraction of granular carbide of 0.1 μm or more in grain size is controlled within this range, the microstructure of the cold-rolled steel sheet for hot pressing is not limited.

If the volume fraction of granular carbide of 0.1 μm or more in grain size is less than 1.0% or more than 25%, the desired volume fraction of the granular carbide cannot be achieved after hot pressing, and the delayed fracture resistance decreases. The volume fraction is preferably 3.0% or more. The volume fraction is preferably 20% or less. The definitions and measurements of the grain size and the volume fraction are the same as those in the hot-pressed member.

In one of the disclosed embodiments, the cold-rolled steel sheet for hot pressing has a coating or plating layer at its surface.

[Coating or Plating Layer]

The cold-rolled steel sheet for hot pressing according to one of the disclosed embodiments may have a Ni-containing coating or plating layer at its surface. As a result of hot pressing the cold-rolled steel sheet having the Ni-containing coating or plating layer, Ni in the coating or plating layer diffuses into the surface layer of the steel sheet, and a hot-pressed member having a Ni diffusion region in its surface layer is obtained.

The Ni-containing coating or plating layer is, for example, a Ni-containing Zn or Zn alloy coating or plating layer. An example is a coating or plating layer containing 7 mass % or more and 25 mass % or less Ni with the balance consisting of Zn and inevitable impurities. The Ni-containing Zn or Zn alloy coating or plating layer can be formed by a coating or plating treatment such as hot-dip galvanizing treatment, galvannealing treatment, or electrogalvanizing treatment.

The thickness of the Ni-containing coating or plating layer may be 0.5 μm or more and is preferably 1.0 μm or more, from the viewpoint of forming the Ni diffusion region in the hot-pressed member. The thickness of the Ni-containing coating or plating layer may be 200 μm or less and is preferably 150 μm or less, from the viewpoint of weldability. The thickness may be 50 μm or less.

The thickness of the Ni-containing coating or plating layer can be measured as follows:

A test piece for microstructure observation is collected so that a thickness section parallel to the rolling direction will be an observation plane. After polishing the observation plane, the element distributions of Fe and Ni are mapped in the surface layer for ten observation fields (one observation field: 200 μm×200 μm) using an electron probe microanalyzer (EPMA). In the mapping, a region in which the concentration of Ni is higher than in the surroundings is taken to be a Ni-containing coating or plating layer, and its average length in the depth direction is calculated and taken to be the thickness of the Ni-containing coating or plating layer.

[Manufacturing Method for Cold-Rolled Steel Sheet for Hot Pressing]

A manufacturing method for a cold-rolled steel sheet for hot pressing according to one of the disclosed embodiments will be described in detail below. The manufacturing method includes: hot rolling a steel slab having the foregoing chemical composition at a finisher delivery temperature of 840° C. or more and 950° C. or less to obtain a hot-rolled steel sheet; cooling the hot-rolled steel sheet to a cooling stop temperature of 700° C. or less at a primary average cooling rate of 55° C./s or more as primary cooling, thereafter cooling the hot-rolled steel sheet to a coiling start temperature of 650° C. or less at a secondary average cooling rate of 5° C./s or more and 60° C./s or less as secondary cooling, and thereafter subjecting the hot-rolled steel sheet to coiling and pickling; cold rolling the hot-rolled steel sheet to obtain a cold-rolled steel sheet; and heating the cold-rolled steel sheet to a soaking temperature of 550° C. or more and 680° C. or less at an average heating rate of 1° C./s or less, holding the cold-rolled steel sheet at the temperature for 60 min or more and 3000 min or less, and thereafter cooling the cold-rolled steel sheet to room temperature.

<Hot Rolling>

After manufacturing a steel slab having the foregoing chemical composition, the steel slab is hot rolled. The hot rolling start temperature of the steel slab is preferably 1150° C. or more. The hot rolling start temperature of the steel slab is preferably 1270° C. or less. In the present disclosure, it is preferable to, after casting the steel slab, start hot rolling at a temperature of 1150° C. or more and 1270° C. or less without reheating, or reheat the steel slab to a temperature of 1150° C. or more and 1270° C. or less and then start hot rolling. In detail, in the present disclosure, not only a conventional method of, after manufacturing a steel slab, cooling the steel slab to room temperature and then reheating the steel slab but also any energy saving process such as a method of charging a warm slab into a heating furnace without cooling, a method of immediately rolling after heat retention, or a method of hot direct rolling or direct rolling whereby a steel slab is directly rolled after casting may be used.

Finisher Delivery Temperature: 840° C. or More and 950° C. or Less

The hot rolling needs to be finished in an austenite single phase region, in order to improve the delayed fracture resistance of the base metal after annealing and hot pressing and the weld portion of the hot-pressed member by uniform refinement of microstructure in the steel sheet and reduction of anisotropy in material property. The finisher delivery temperature is therefore 840° C. or more. The finisher delivery temperature is preferably 880° C. or more. If the finisher delivery temperature is more than 950° C., the hot-rolled microstructure coarsens, and the crystal grains after annealing coarsen, too. The finisher delivery temperature is therefore 950° C. or less. The finisher delivery temperature is preferably 930° C. or less.

<Cooling after Hot Rolling>

Primary Cooling: Cooling to Cooling Stop Temperature of 700° C. or Less at Primary Average Cooling Rate of 55° C./s or More In a cooling process after the hot rolling finish, austenite transforms into ferrite. Here, given that ferrite coarsens at high temperature, the hot-rolled steel sheet is rapidly cooled after the hot rolling finish to homogeneously refine the microstructure as much as possible. Accordingly, first the hot-rolled steel sheet is cooled from the finisher delivery temperature to a cooling stop temperature of 700° C. or less at a primary average cooling rate of 55° C./s or more, as primary cooling.

If the primary average cooling rate is less than 55° C./s, ferrite coarsens, causing the microstructure of the hot-rolled steel sheet to be heterogeneous. As a result, the prior austenite grain size after annealing and hot pressing coarsens, and the delayed fracture resistance of the base metal and the weld portion decreases. The primary average cooling rate is therefore 55° C./s or more. The primary average cooling rate is preferably 60° C./s or more. Although no upper limit is placed on the primary average cooling rate, the primary average cooling rate may be 150° C./s or less, and is preferably 130° C./s or less.

If the cooling stop temperature in the primary cooling is more than 700° C., pearlite forms excessively in the microstructure of the hot-rolled steel sheet, resulting in heterogeneous microstructure after annealing and hot pressing. Thus, uniform fine grains are not obtained, and the delayed fracture resistance of the base metal and the weld portion decreases. The cooling stop temperature is therefore 700° C. or less. The cooling stop temperature is preferably 680° C. or less.

Secondary Cooling: Cooling to Coiling Start Temperature of 650° C. or Less at Secondary Average Cooling Rate of 5° C./s or More and 60° C./s or Less The hot-rolled steel sheet is cooled from the cooling stop temperature to the coiling start temperature, as secondary cooling. If the secondary average cooling rate is less than 5° C./s, ferrite or pearlite forms excessively in the microstructure of the hot-rolled steel sheet, resulting in heterogeneous microstructure after annealing and hot pressing. Thus, uniform fine grains are not obtained, and the delayed fracture resistance of the base metal and the weld portion decreases. The secondary average cooling rate is therefore 5° C./s or more. The secondary average cooling rate is preferably 7° C./s or more. If the secondary average cooling rate is more than 60° C./s, the effect of suppressing excessive formation of ferrite or pearlite is saturated. The secondary average cooling rate is therefore 60° C./s or less. The secondary average cooling rate is preferably 40° C./s or less.

If the coiling start temperature to which the hot-rolled steel sheet is cooled is more than 650° C., coarse ferrite or pearlite forms excessively in the microstructure of the hot-rolled steel sheet, as a result of which the delayed fracture resistance decreases. The hot-rolled steel sheet is cooled to the coiling start temperature of 650° C. or less at the foregoing average cooling rate, and then coiling is started. Although no lower limit is placed on the coiling start temperature, the coiling start temperature is preferably 300° C. or more from the viewpoint of avoiding a situation in which, due to excessively low coiling temperature, hard martensite forms excessively and the cold rolling load increases.

<Coiling>

Coiling Temperature: 650° C. or Less

If the coiling temperature is more than 650° C., ferrite and pearlite coarsen in the microstructure of the hot-rolled steel sheet, causing the final steel sheet microstructure to be heterogeneous. As a result, the desired volume fraction of granular carbide is not obtained after annealing and hot pressing, and the delayed fracture resistance of the base metal and the weld portion decreases. The coiling temperature is preferably 610° C. or less. The coiling temperature is preferably 300° C. or more.

<Pickling>

After the coiling, pickling is performed to remove scale in the surface layer of the hot-rolled steel sheet. The pickling treatment is not limited, and may be performed according to a conventional method.

<Cold Rolling>

Cold rolling of rolling the obtained hot-rolled steel sheet to a cold-rolled steel sheet with a predetermined thickness is performed. The cold rolling is not limited, and may be performed according to a conventional method. The thickness is not limited. The thickness may be 0.4 mm or more, and is preferably 0.5 mm or more. The thickness may be 4.0 mm or less, and is preferably 3.8 mm or less.

<Annealing>

Annealing is intended to promote recrystallization after the cold rolling and form granular carbide. The cold-rolled steel sheet is heated to a soaking temperature of 550° C. or more and 680° C. or less at an average heating rate of 1° C./s or less, held at the soaking temperature for 60 min or more and 3000 min or less, and thereafter cooled to room temperature.

Average Heating Rate: 1° C./s or Less

By controlling the heating rate in the annealing, the crystal grains after the annealing can be refined. If the cold-rolled steel sheet is rapidly heated, the formation of granular carbide is insufficient. Consequently, the desired volume fraction of granular carbide is not obtained after the annealing and hot pressing, and the delayed fracture resistance of the base metal and the weld portion decreases. The average heating rate is therefore 1° C./s or less. The average heating rate is preferably 0.8° C./s or less. From the viewpoint of production efficiency, the average heating rate may be 0.01° C./s or more, and is preferably 0.05° C./s or more.

Soaking Temperature: 550° C. or More and 680° C. or Less, Holding Time: 60 Min or More and 3000 Min or Less The soaking temperature is higher than the recrystallization temperature. If the soaking temperature is less than 550° C., recrystallization is insufficient, and granular carbide does not grow large. Consequently, the desired volume fraction of granular carbide is not obtained after annealing and hot pressing, and the delayed fracture resistance of the base metal and the weld portion after hot pressing decreases. The soaking temperature is therefore 550° C. or more. The soaking temperature is preferably 570° C. or more. If the soaking temperature is excessively high, crystal grains coarsen. Consequently, the desired volume fraction of granular carbide is not obtained after annealing and hot pressing, and the delayed fracture resistance of the base metal and the weld portion after hot pressing decreases. The soaking temperature is therefore 680° C. or less. The soaking temperature is preferably 650° C. or less. The soaking temperature is more preferably 620° C. or less.

To form sufficient granular carbide at the foregoing soaking temperature and ensure the delayed fracture resistance of the base metal and the weld portion after hot pressing, the holding time needs to be 60 min or more. The holding time is preferably 100 min or more. If the holding time is more than 3000 min, the volume fraction of granular carbide increases, and the granular carbide excessively segregates to a heat-affected zone (HAZ) after resistance spot welding, as a result of which the delayed fracture resistance of the weld portion decreases. The holding time is preferably 2400 min or less.

The cooling after the holding is not limited. Depending on the heating furnace, etc. used, the cold-rolled steel sheet may be allowed to cool (slow cooling) or subjected to controlled cooling.

In another one of the disclosed embodiments, the manufacturing method for a cold-rolled steel sheet for hot pressing further includes a coating or plating treatment with a Ni-containing coating or plating.

<Coating or Plating>

The cold-rolled steel sheet for hot pressing is subjected to a coating or plating treatment with a Ni-containing coating or plating, to form a Ni-containing coating or plating layer. As a result of hot pressing the cold-rolled steel sheet having the Ni-containing coating or plating layer, Ni in the coating or plating layer diffuses into the surface layer of the steel sheet, and a hot-pressed member having a Ni diffusion region in its surface layer is obtained.

The Ni-containing coating or plating layer is, for example, a Ni-containing Zn or Zn alloy coating or plating layer. An example is a coating or plating layer containing 10 mass % or more and 25 mass % or less Ni with the balance consisting of Zn and inevitable impurities. Such Zn or Zn alloy coating or plating layer can be formed by a coating or plating treatment such as hot-dip galvanizing treatment, galvannealing treatment, or electrogalvanizing treatment.

The thickness of the Ni-containing coating or plating layer may be 0.5 μm or more and is preferably 0.8 μm or more, from the viewpoint of forming the Ni diffusion region in the hot-pressed member. The thickness of the Ni-containing coating or plating layer may be 100 μm or less and is preferably 70 μm or less, from the viewpoint of productivity.

The cold-rolled steel sheet may be subjected to temper rolling. In this case, the elongation ratio is preferably 0.05% or more and 2.0% or less.

[Manufacturing Method for Hot-Pressed Member]

A manufacturing method for a hot-pressed member according to one of the disclosed embodiments will be described in detail below. The manufacturing method for a hot-pressed member according to one of the disclosed embodiments includes heating a cold-rolled steel sheet for hot pressing to a temperature range of 850° C. or more and 1000° C. or less, and thereafter hot pressing the cold-rolled steel sheet. The manufacturing method is not limited, and may be a publicly known method. For example, the manufacturing method is as follows.

Heating Temperature: 850° C. or More and 1000° C. or Less

The heating temperature is 850° C. or more, in order to quench the steel sheet sufficiently. The heating temperature is preferably Ac3 point or more, in order to achieve sufficient austenitizing and ensure the amount of martensite. From the viewpoint of economic efficiency and suppression of oxide formation, the heating temperature is 1000° C. or less. The heating temperature is preferably 950° C. or less.

The average heating rate to the heating temperature is not limited, and may be 1° C./s or more and 400° C./s or less. If the average heating rate is 1° C./s or more, the productivity is not impaired. If the average heating rate is 400° C./s or less, unstable temperature control can be prevented. The average heating rate is preferably 10° C./s or more. The average heating rate is preferably 150° C./s or less.

The holding time is not limited, and may be 1 sec or more and 1000 sec or less. If the holding time is 1 sec or more, sufficient hardenability can be ensured. If the holding time is 1000 sec or less, grain size coarsening can be suppressed. The holding time is preferably 5 sec or more. The holding time is preferably 850 sec or less.

The heating method is not limited, and examples include an electric furnace, a gas furnace, infrared heating, high frequency heating, and direct electrical resistance heating. The atmosphere in the heating is not limited, and examples include an air atmosphere and an inert gas atmosphere.

The cold-rolled steel sheet heated as described above is set in a press mold including a die and a punch, subjected to press forming, and cooled under desired cooling conditions. A hot-pressed member can thus be manufactured.

Examples

Examples according to the present disclosure will be described below.

The present disclosure is not limited to the examples described below. Modifications can be appropriately made within the range in which the subject matter of the present disclosure is applicable, with all such modifications being also included in the technical scope of the present disclosure.

Steels having the chemical compositions shown in Table 1 were each obtained by steelmaking, and continuously cast under the conditions shown in Table 2 to obtain a slab. The slab was then heated to 1250° C., and subsequently hot rolled under the conditions of the finisher delivery temperature (FDT) shown in Table 2. Thereafter, the hot-rolled steel sheet was cooled to the cooling stop temperature (first cooling temperature) at the primary average cooling rate (cooling rate 1) shown in Table 2, then cooled to the coiling start temperature (CT) at the secondary average cooling temperature (cooling rate 2), and then coiled.

Thereafter, the obtained hot-rolled steel sheet was pickled, and then cold rolled at the rolling reduction shown in Table 2. The heat treatment shown in Table 2 was performed to obtain a cold-rolled steel sheet (thickness: 1.4 mm).

The obtained cold-rolled steel sheet was subjected to an annealing treatment in a batch annealing furnace (BAF) under the conditions shown in Table 2, to obtain a cold-rolled steel sheet (CR). In the table, (CR) indicates a cold-rolled steel sheet (non-coated or plated steel sheet) for which only the annealing treatment was performed in the batch annealing furnace (BAF) without any coating or plating treatment. For part of the cold-rolled steel sheets, after the batch annealing, a Ni-containing hot-dip galvanized steel sheet (GI, Ni content: 12 mass %) was obtained in a continuous galvanizing line (CGL). For part of the steel sheets that had passed through the CGL, hot-dip galvanizing treatment was performed and then alloying treatment was performed at 550° C., to obtain a galvannealed steel sheet (GA, Ni content: 12 mass %). Further, for part of the cold-rolled steel sheets, after the batch annealing, a zinc-nickel electroplated steel sheet (EZN, Ni content: 12 mass %) was obtained in an electrogalvanizing line (EGL).

Each obtained cold-rolled steel sheet (coated or plated steel sheet) was subjected to hot pressing.

The dimensions of a press mold used in the hot pressing were as follows: punch width: 70 mm, shoulder area of punch: R4 mm, shoulder area of die: R4 mm, and forming depth: 30 mm. The cold-rolled steel sheet was heated in the air, using an infrared heating furnace or an atmosphere heating furnace depending on the heating rate. After the pressing, the steel sheet was cooled from the pressing (start) temperature to 150° C. by a combination of: clamping the steel sheet between the die and the punch; and air cooling on the die after release from the clamping.

The microstructure of each of the hot-pressed member and the cold-rolled steel sheet, the Ni diffusion region, and the thickness of the coating or plating layer were measured by the methods described above. The results are shown in Table 3.

Property evaluation was performed as follows. The results are shown in Table 3.

<Measurement of Tensile Strength (TS)>

A JIS No. 5 tensile test piece was collected from the position of a hat bottom portion of the hot-pressed member, and a tensile test was conducted in accordance with JIS Z 2241 to measure the tensile strength (TS).

<Delayed Fracture Resistance: Evaluation of Base Metal>

A JIS No. 5 tensile test piece was collected from the position of the hat bottom portion of the hot-pressed member, and a constant load test was conducted. The tensile test piece was subjected to a load while being immersed in a hydrochloric acid solution (pH3) at room temperature, and whether the tensile test piece fractured was evaluated. The load stress was set to 1000 MPa. In the case where the tensile test piece did not fracture for 100 hr or more, the delayed fracture resistance was evaluated as good. In the case where the tensile test piece fractured in less than 100 hr, the delayed fracture resistance was evaluated as poor.

<Delayed Fracture Resistance: Evaluation of Weld (after Resistance Spot Welding)>

Regarding delayed fractures after resistance spot welding, resistance welding (spot welding) was performed using two tensile shear test pieces from the position of the hat bottom portion of the hot-pressed member obtained in accordance with JIS Z 3136. A sheet combination of two overlapping steel sheets was subjected to resistance spot welding using, as a welder, a single phase DC (50 Hz) resistance welder of servomotor pressure type attached to a welding gun. The welding conditions were as follows: electrode force: 4.5 kN, holding time: 0.1 sec. The welding current and the welding time were adjusted so that the nugget diameter would be 6.0 mm.

A tensile shear test in accordance with JIS Z 3136 was conducted on the obtained weld, and the load when the steel sheet peeled was measured. The peeling strength at the time was set as FS. A tensile shear test piece was produced by the same method as above, and subjected to a load of 0.6×FS. After this, the tensile shear test piece was immersed in a hydrochloric acid solution of pH=3.0 at room temperature for 100 hr, and whether the steel sheet peeled was evaluated. In the case where the steel sheet did not peel, the delayed fracture resistance was evaluated as good. In the case where the steel sheet peeled, the delayed fracture resistance was evaluated as poor.

TABLE 1

| Steel sample ID | Chemical composition (mass %) | | | | | | | | | | | | | | | | | | Remarks |
|---|---|---|---|---|---|---|---|---|---|---|---|---|---|---|---|---|---|---|---|
| | C | Si | Mn | P | S | Al | N | Cu | Mo | Cr | Nb | Ti | B | Ca | V | Sb | Ni | Sn | |
| A | 0.35 | 0.25 | 1.54 | 0.01 | 0.001 | 0.03 | 0.002 | 0.012 | 0.19 | — | — | 0.02 | 0.0011 | — | 0.02 | — | — | — | Conforming steel |
| B | 0.34 | 0.34 | 1.74 | 0.01 | 0.001 | 0.03 | 0.002 | 0.004 | — | 0.16 | 0.01 | 0.02 | 0.0021 | — | — | 0.005 | — | — | Conforming steel |
| C | 0.46 | 0.22 | 1.25 | 0.01 | 0.001 | 0.02 | 0.003 | 0.105 | 0.12 | 0.25 | 0.01 | — | — | — | — | — | — | — | Conforming steel |
| D | 0.32 | 0.64 | 2.12 | 0.02 | 0.001 | 0.02 | 0.002 | 0.245 | — | — | — | 0.003 | — | 0.001 | 0.03 | — | 0.11 | — | Conforming steel |
| E | 0.27 | 0.23 | 1.94 | 0.01 | 0.001 | 0.03 | 0.003 | 0.084 | — | — | — | — | — | — | — | — | — | — | Comparative steel |

TABLE 1-continued

| Steel sample ID | Chemical composition (mass %) | | | | | | | | | | | | | | | | | | Remarks |
|---|---|---|---|---|---|---|---|---|---|---|---|---|---|---|---|---|---|---|---|
| | C | Si | Mn | P | S | Al | N | Cu | Mo | Cr | Nb | Ti | B | Ca | V | Sb | Ni | Sn | |
| F | 0.58 | 0.34 | 2.10 | 0.01 | 0.001 | 0.03 | 0.002 | 0.044 | — | — | — | — | — | — | — | — | — | — | Comparative steel |
| G | 0.33 | 0.26 | 1.34 | 0.01 | 0.001 | 0.04 | 0.002 | — | — | 0.05 | — | 0.02 | 0.0019 | — | — | — | — | — | Comparative steel |
| H | 0.54 | 0.03 | 1.05 | 0.01 | 0.001 | 0.47 | 0.002 | 0.012 | — | — | — | — | — | — | — | — | — | — | Conforming steel |
| I | 0.32 | 0.94 | 2.44 | 0.01 | 0.001 | 0.02 | 0.003 | 0.105 | 0.12 | 0.01 | 0.01 | — | — | — | — | — | — | 0.11 | Conforming steel |

TABLE 2

| Sample No. | Steel sample ID | Hot rolling | | | | | Cold rolling Rolling reduction % | Annealing | | | | Hot pressing | | Heating method | Remarks |
|---|---|---|---|---|---|---|---|---|---|---|---|---|---|---|---|
| | | FDT °C. | Cooling rate 1 °C./s | First cooling temperature °C. | Cooling rate 2 °C./s | CT °C. | | Average heating time °C./s | Soaking temperature °C. | Holding time min | Coating or Plating | Heating temperature °C. | Holding time sec | | |
| 1 | A | 880 | 100 | 660 | 20 | 600 | 50 | 0.1 | 600 | 1200 | EZN | 860 | 300 | Electric heating furnace | Example |
| 2 | B | 900 | 75 | 660 | 20 | 550 | 40 | 0.1 | 600 | 100 | EZN | 880 | 950 | Gas furnace | Example |
| 3 | C | 900 | 60 | 640 | 20 | 600 | 60 | 0.9 | 650 | 1200 | GA | 900 | 10 | Infrared heating furnace | Example |
| 4 | D | 850 | 85 | 650 | 7 | 520 | 70 | 0.2 | 600 | 2400 | GA | 980 | 50 | High-frequency heating | Example |
| 5 | E | 930 | 110 | 675 | 20 | 600 | 30 | 0.1 | 600 | 200 | GI | 880 | 100 | Electric heating furnace | Comparative Example |
| 6 | F | 900 | 85 | 640 | 15 | 580 | 50 | 0.3 | 650 | 600 | GI | 860 | 200 | Electric heating furnace | Comparative Example |
| 7 | G | 900 | 80 | 680 | 40 | 580 | 50 | 0.1 | 600 | 1800 | EZN | 900 | 300 | Electric heating furnace | Comparative Example |
| 8 | A | 750 | 60 | 660 | 20 | 600 | 50 | 0.1 | 600 | 600 | GA | 920 | 500 | Gas furnace | Comparative Example |
| 9 | A | 900 | 30 | 640 | 20 | 570 | 50 | 0.1 | 620 | 600 | GA | 940 | 700 | Gas furnace | Comparative Example |
| 10 | A | 940 | 55 | 740 | 20 | 600 | 50 | 0.1 | 600 | 600 | GA | 880 | 900 | Gas furnace | Comparative Example |
| 11 | A | 900 | 80 | 660 | 2 | 500 | 50 | 0.2 | 600 | 800 | GI | 900 | 600 | Electric heating furnace | Comparative Example |
| 12 | A | 940 | 65 | 690 | 5 | 690 | 50 | 0.1 | 600 | 800 | GI | 820 | 400 | Electric heating furnace | Comparative Example |
| 13 | A | 880 | 70 | 695 | 30 | 580 | 50 | 5 | 650 | 60 | GI | 880 | 200 | Electric heating furnace | Comparative Example |
| 14 | A | 900 | 85 | 660 | 20 | 560 | 50 | 0.1 | 450 | 1000 | GI | 920 | 100 | Gas furnace | Comparative Example |
| 15 | A | 900 | 80 | 695 | 20 | 620 | 50 | 0.2 | 800 | 600 | GI | 880 | 50 | Gas furnace | Comparative Example |
| 16 | A | 900 | 85 | 660 | 35 | 580 | 50 | 0.1 | 600 | 5 | GI | 860 | 20 | Gas furnace | Comparative Example |
| 17 | A | 860 | 85 | 690 | 20 | 630 | 50 | 0.1 | 600 | 5000 | GI | 880 | 300 | Electric heating furnace | Comparative Example |

TABLE 2-continued

| | | Hot rolling | | | | Cold rolling | Annealing | | | | Hot pressing | | | |
|---|---|---|---|---|---|---|---|---|---|---|---|---|---|---|
| Sample No. | Steel sample ID | FDT °C. | Cooling rate 1 °C./s | First cooling temperature °C. | Cooling rate 2 °C./s | CT °C. | Rolling reduction % | Average heating time °C./s | Soaking temperature °C. | Holding time min | Coating or Plating | Heating temperature °C. | Holding time sec | Heating method | Remarks |
| 18 | A | 900 | 85 | 660 | 35 | 600 | 50 | 0.1 | 600 | 800 | CR | 880 | 600 | Electric heating furnace | Comparative Example |
| 19 | H | 860 | 75 | 670 | 25 | 580 | 40 | 0.2 | 600 | 2800 | GI | 880 | 3 | Direct electrical resistance heating | Example |
| 20 | I | 880 | 95 | 680 | 55 | 600 | 60 | 0.1 | 600 | 1200 | EZN | 880 | 100 | Electric heating furnace | Example |

TABLE 3

| | Steel sheet microstructure of cold-rolled steel sheet | | Steel sheet microstructure of hot-pressed member | | | | Tensile property | Delayed fracture resistance | | |
|---|---|---|---|---|---|---|---|---|---|---|
| Sample No. | Granular carbide Volume fraction (%) | Ni-containing coating or plating layer μm | Martensite Volume fraction (%) | Prior austenite Average grain size (μm) | Granular carbide Volume fraction (%) | Ni diffusion region (μm) | TS MPa | Base metal | Weld portion | Remarks |
| 1 | 7 | 6 | 99 | 6 | 0.8 | 10 | 1985 | Good | Good | Example |
| 2 | 2 | 12 | 98 | 6 | 0.2 | 20 | 2025 | Good | Good | Example |
| 3 | 10 | 12 | 97 | 5 | 2.4 | 18 | 2321 | Good | Good | Example |
| 4 | 6 | 2 | 99 | 4 | 0.9 | 3 | 2025 | Good | Good | Example |
| 5 | 0.7 | 11 | 94 | 7 | 0.03 | 21 | 1587 | Poor | Poor | Comparative Example |
| 6 | 26 | 9 | 95 | 6 | 4.2 | 15 | 2635 | Poor | Poor | Comparative Example |
| 7 | 7 | 10 | 98 | 7 | 1.2 | 20 | 2011 | Poor | Poor | Comparative Example |
| 8 | 8 | 10 | 98 | 9 | 1.6 | 20 | 1988 | Poor | Poor | Comparative Example |
| 9 | 7 | 10 | 99 | 9 | 0.9 | 19 | 2015 | Poor | Poor | Comparative Example |
| 10 | 7 | 15 | 98 | 9 | 0.5 | 26 | 2019 | Poor | Poor | Comparative Example |
| 11 | 7 | 12 | 99 | 9 | 0.9 | 21 | 2001 | Poor | Poor | Comparative Example |
| 12 | 0.8 | 11 | 99 | 7 | 0.05 | 18 | 2088 | Poor | Poor | Comparative Example |
| 13 | 0.6 | 10 | 99 | 7 | 0.05 | 11 | 2021 | Poor | Poor | Comparative Example |
| 14 | 0.1 | 10 | 98 | 7 | 0.02 | 18 | 2019 | Poor | Poor | Comparative Example |
| 15 | 0.1 | 11 | 99 | 9 | 0.01 | 19 | 2025 | Poor | Poor | Comparative Example |
| 16 | 0.1 | 10 | 99 | 6 | 0.02 | 18 | 1988 | Poor | Poor | Comparative Example |
| 17 | 26 | 10 | 95 | 6 | 4.1 | 19 | 2025 | Good | Poor | Comparative Example |
| 18 | 9 | 0 | 98 | 6 | 1.1 | 0 | 2015 | Poor | Poor | Comparative Example |
| 19 | 24 | 12 | 95 | 6 | 3.8 | 20 | 2420 | Good | Good | Example |
| 20 | 7 | 10 | 99 | 6 | 0.9 | 18 | 2035 | Good | Good | Example |

In all Examples, hot-pressed members combining both high strength of 1850 MPa or more in TS and excellent delayed fracture resistance (base metal and weld) were obtained.

The invention claimed is:

1. A hot-pressed member, comprising:
a chemical composition consisting of, in mass %,
C: 0.31% or more and less than 0.55%,
Si: 0.01% or more and 1.0% or less,
Mn: 1.0% or more and 2.5% or less,
P: 0.05% or less,
S: 0.005% or less,
Al: 0.01% or more and 0.50% or less,
N: 0.01% or less, and
Cu: 0.002% or more and 0.25% or less,
and optionally one or more one or more selected from the group consisting of
Mo: 0.005% or more and 0.35% or less,
Cr: 0.005% or more and 0.35% or less,
Nb: 0.001% or more and 0.05% or less,
Ti: 0.001% or more and 0.050% or less,
B: 0.0002% or more and 0.0050% or less,
Ca: 0.005% or less,
V: 0.05% or less,
Sb: 0.001% or more and 0.020% or less,
Ni: 0.50% or less, and
Sn: 0.50% or less,
with a balance consisting of Fe and inevitable impurities;
a microstructure in which a prior austenite average grain size is 8 μm or less, a volume fraction of martensite is 95% or more, and a volume fraction of granular carbide of 0.1 μm or more in grain size is 0.10% or more and 4.0% or less;

a Ni diffusion region of 2.0 μm or more in a depth direction in a surface layer; and a tensile strength of 1850 MPa or more.

2. The hot-pressed member according to claim 1, further comprising a Ni-containing Zn or Zn alloy coating or plating layer at a surface thereof.

3. A cold-rolled steel sheet for hot pressing, comprising:

a chemical composition consisting of, in mass %,

C: 0.31% or more and less than 0.55%,
Si: 0.01% or more and 1.0% or less,
Mn: 1.0% or more and 2.5% or less,
P: 0.05% or less,
S: 0.005% or less,
Al: 0.01% or more and 0.50% or less,
N: 0.01% or less, and
Cu: 0.002% or more and 0.25% or less, and optionally one or more selected from the group consisting of Mo: 0.005% or more and 0.35% or less,
Cr: 0.005% or more and 0.35% or less,
Nb: 0.001% or more and 0.05% or less,
Ti: 0.001% or more and 0.050% or less,
B: 0.0002% or more and 0.0050% or less,
Ca: 0.005% or less,
V: 0.05% or less,
Sb: 0.001% or more and 0.020% or less,
Ni: 0.50% or less, and
Sn: 0.50% or less, with a balance consisting of Fe and inevitable impurities; and a microstructure in which a volume fraction of granular carbide of 0.1 μm or more in grain size is 1.0% or more and 25% or less.

4. The cold-rolled steel sheet for hot pressing according to claim 3, further comprising a Ni-containing coating or plating layer of 0.5 μm or more in thickness, at a surface thereof.

5. The cold-rolled steel sheet for hot pressing according to claim 4, wherein the Ni-containing coating or plating layer is a Ni-containing Zn or Zn alloy coating or plating layer.

6. A manufacturing method for a cold-rolled steel sheet for hot pressing, comprising:

hot rolling a steel slab having the chemical composition according to claim 3 at a finisher delivery temperature of 840° C. or more and 950° C. or less, to obtain a hot-rolled steel sheet;

cooling the hot-rolled steel sheet to a cooling stop temperature of 700° C. or less at a primary average cooling rate of 55° C./s or more as primary cooling, thereafter cooling the hot-rolled steel sheet to a coiling start temperature of 650° C. or less at a secondary average cooling rate of 5° C./s or more and 60° C./s or less as secondary cooling, and thereafter subjecting the hot-rolled steel sheet to coiling and pickling;

cold rolling the hot-rolled steel sheet after the pickling, to obtain a cold-rolled steel sheet; and heating the cold-rolled steel sheet to a soaking temperature of 550° C. or more and 680° C. or less at an average heating rate of 1° C./s or less, holding the cold-rolled steel sheet at the temperature for 60 min or more and 3000 min or less, and thereafter cooling the cold-rolled steel sheet to room temperature.

7. The manufacturing method for a cold-rolled steel sheet for hot pressing according to claim 6, comprising performing a coating or plating treatment on a surface of the cold-rolled steel sheet with a Ni-containing coating or plating.

8. A manufacturing method for a hot-pressed member, comprising heating the cold-rolled steel sheet for hot pressing according to claim 3 to a temperature range of 850° C. or more and 1000° C. or less, and thereafter hot pressing the cold-rolled steel sheet.

9. A manufacturing method for a hot-pressed member, comprising heating the cold-rolled steel sheet for hot pressing according to claim 4 to a temperature range of 850° C. or more and 1000° C. or less, and thereafter hot pressing the cold-rolled steel sheet.

10. A manufacturing method for a hot-pressed member, comprising heating the cold-rolled steel sheet for hot pressing according to claim 5 to a temperature range of 850° C. or more and 1000° C. or less, and thereafter hot pressing the cold-rolled steel sheet.

* * * * *